(12) United States Patent
Das et al.

(10) Patent No.: US 8,704,713 B2
(45) Date of Patent: Apr. 22, 2014

(54) METHODS AND APPARATUSES FOR USE IN IDENTIFYING WIRELESS TRANSMITTING DEVICES FOR USE IN ESTIMATING A LOCATION OF A MOBILE DEVICE

(75) Inventors: Saumitra Mohan Das, San Jose, CA (US); Ayman Fawzy Naguib, Santa Clara, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 13/008,801

(22) Filed: Jan. 18, 2011

(65) Prior Publication Data

US 2011/0183626 A1 Jul. 28, 2011

Related U.S. Application Data

(60) Provisional application No. 61/297,436, filed on Jan. 22, 2010.

(51) Int. Cl.
*G01S 3/02* (2006.01)

(52) U.S. Cl.
USPC ........................................... 342/464

(58) Field of Classification Search
USPC .......... 342/463–465; 455/456.1, 456.2, 456.6
See application file for complete search history.

(56) References Cited

U.S. PATENT DOCUMENTS

| 7,738,884 B2 * | 6/2010 | Cheung et al. | ............. 455/456.3 |
| 2002/0094824 A1 | 7/2002 | Kennedy, Jr. et al. | |
| 2002/0132626 A1 | 9/2002 | Tsunehara et al. | |
| 2005/0124355 A1 | 6/2005 | Cromer et al. | |
| 2005/0176406 A1 | 8/2005 | Krishnakumar et al. | |
| 2006/0087425 A1 | 4/2006 | Haeberlen et al. | |
| 2006/0205417 A1 | 9/2006 | Ju et al. | |
| 2006/0240840 A1 | 10/2006 | Morgan et al. | |
| 2007/0121560 A1* | 5/2007 | Edge | ............................. 370/338 |
| 2007/0149211 A1 | 6/2007 | Dunn et al. | |
| 2007/0202887 A1 | 8/2007 | Counts et al. | |
| 2007/0258409 A1 | 11/2007 | Alizadeh-Shabdiz et al. | |
| 2009/0067392 A1 | 3/2009 | Hart et al. | |
| 2010/0250727 A1 | 9/2010 | King et al. | |
| 2010/0255856 A1 | 10/2010 | Kansal et al. | |

FOREIGN PATENT DOCUMENTS

| EP | 1703758 A1 | 9/2006 |
| EP | 2173130 A1 | 4/2010 |

(Continued)

OTHER PUBLICATIONS

International Search Report and Written Opinion—PCT/US2011/021936, ISA/EPO—Jun. 22, 2011.

(Continued)

*Primary Examiner* — Cassie Galt
(74) *Attorney, Agent, or Firm* — Arnold J. Gum

(57) ABSTRACT

Techniques for provided which may be implemented using various methods and/or apparatuses to allow a mobile device to identify and select certain wireless transmitting devices for use in estimating a location of the mobile device. For example with one method, a mobile device may identify a plurality of wireless transmitting devices from which measurements are obtainable to estimate a location of the mobile device, and select a set of wireless transmitting devices based, at least in part, on a location reliability indicator.

89 Claims, 5 Drawing Sheets

(56) References Cited

FOREIGN PATENT DOCUMENTS

| EP | 2199818 A1 | 6/2010 |
|----|------------|--------|
| WO | WO0056090 A1 | 9/2000 |
| WO | WO0105184 A1 | 1/2001 |
| WO | WO03049479 A1 | 6/2003 |
| WO | WO2007001660 A2 | 1/2007 |
| WO | 2007025159 | 3/2007 |

OTHER PUBLICATIONS

"A. Narzullaev et al., "Accurate signal strength prediction based positioning for indoor WLAN systems," IEEE, ION Position, Location and Navigation Symposium, May 2008, pp. 685-688."

Zbou Mu et al., "ANN Indoor Position Determination Based on Area Correlation in WLAN Environment," School of Electronics and Information Technology, Harbin Institute of Technology, Harbin, China, 2009, pp. 4.

\* cited by examiner

METHODS AND APPARATUSES FOR USE IN IDENTIFYING WIRELESS TRANSMITTING DEVICES FOR USE IN ESTIMATING A LOCATION OF A MOBILE DEVICE

This application claims priority under 35 USC 119 to U.S. Provisional Application Ser. No. 61/297,436, filed Jan. 22, 2010, and entitled, "LCI Based Restriction on Positioning Devices for Error Improvement," which is assigned to the assignee hereof and which is incorporated herein by reference.

BACKGROUND

1. Field

The subject matter disclosed herein relates to electronic devices, and more particularly to methods and apparatuses for use in identifying wireless transmitting devices for use in estimating a location of a mobile device.

2. Information

GPS and other like satellite positioning systems have enabled navigation services for mobile handsets in outdoor environments. Since satellite signals may not be reliably received and/or acquired in an indoor environment, different techniques may be employed to enable navigation services. For example, mobile devices can typically obtain a position fix by measuring ranges to three or more terrestrial wireless access points which are positioned at known locations. Such ranges may be measured, for example, by obtaining a MAC ID address from signals received from such access points and measuring one or more characteristics of signals received from such access points such as, for example, signal strength, round trip delay, just to name a few examples.

Typically, measurements of ranges to only three access points is sufficient for obtaining a sufficiently accurate estimate of a location of the mobile device, provided that an estimate of the locations of those three access points and range measurements to same are accurate. However, the accuracy of estimates of locations of access points may vary widely from access point to access point in a navigation system. Inaccuracy in an estimated location of just one of such access points can significantly degrade the accuracy of an estimate a location of a mobile device. As part of a system for determining its location, a mobile device may access information indicative of estimates of locations of nearby wireless access points for use in obtaining a position fix as discussed above. Unfortunately, there is typically no way for a mobile device to evaluate the accuracy or reliability of such locations of wireless access points available for use in obtaining a position fix.

SUMMARY

Techniques for provided which may be implemented using various methods and/or apparatuses to allow a mobile device to identify and select certain wireless transmitting devices for use in estimating a location of the mobile device.

In accordance with an example implementation, a method may be provided which comprises, with a mobile device: identifying a plurality of wireless transmitting devices from which measurements are obtainable to estimate a location of said mobile device; and selecting a set of wireless transmitting devices from the plurality of wireless transmitting devices based, at least in part, on a location reliability indicator associated, respectively, with at least each wireless transmitting device in the set of wireless transmitting devices.

In accordance with another example implementation, an apparatus may be provided for use in a mobile device. The apparatus may comprise: means for identifying a plurality of wireless transmitting devices from which measurements are obtainable to estimate a location of said mobile device; and means for selecting a set of wireless transmitting devices from the plurality of wireless transmitting devices based, at least in part, on a location reliability indicator associated, respectively, with at least each wireless transmitting device in the set of wireless transmitting devices.

In accordance with yet another example implementation, an apparatus may be provided for use in a mobile device. The apparatus may comprise: a wireless network interface; and at least one processing unit to identify a plurality of wireless transmitting devices from which measurements are obtainable via the wireless network interface to estimate a location of the mobile device, and select a set of wireless transmitting devices from the plurality of wireless transmitting devices based, at least in part, on a location reliability indicator associated, respectively, with at least each wireless transmitting device in the set of wireless transmitting devices.

In accordance with another example implementation, an article of manufacture may be provided which comprises a computer readable medium having computer implementable instructions stored therein that are executable by one or more processing units of a mobile device to: identify a plurality of wireless transmitting devices from which measurements are obtainable to estimate a location of said mobile device; and select a set of wireless transmitting devices from the plurality of wireless transmitting devices based, at least in part, on a location reliability indicator associated, respectively, with at least each wireless transmitting device in the set of wireless transmitting devices.

In accordance with still another example implementation, a method may be provided which comprises: associating at least one wireless transmitting device, from which measurements are obtainable to estimate a location of a mobile device, with a location reliability indicator; and transmitting at least the location reliability indicator.

In accordance with another example implementation, an apparatus for use in at least one computing device may be provided. The apparatus may comprise: means for associating at least one wireless transmitting device, from which measurements are obtainable to estimate a location of a mobile device, with a location reliability indicator; and means for transmitting at least the location reliability indicator to at least one other device.

In accordance with yet another example implementation, an apparatus may be provided for use in at least one computing device. The apparatus may comprise: a network interface; and one or more processing units to associate at least one wireless transmitting device, from which measurements are obtainable to estimate a location of a mobile device, with a location reliability indicator, and initiate transmission of the at least said location reliability indicator to at least one other device via said network interface.

In accordance with still another example implementation, an article of manufacture may be provided which comprises a computer readable medium having computer implementable instructions stored therein that are executable by one or more processing units of a computing device to: associate at least one wireless transmitting device, from which measurements are obtainable to estimate a location of a mobile device, with a location reliability indicator; and initiate transmission of at least the location reliability indicator to at least one other device.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
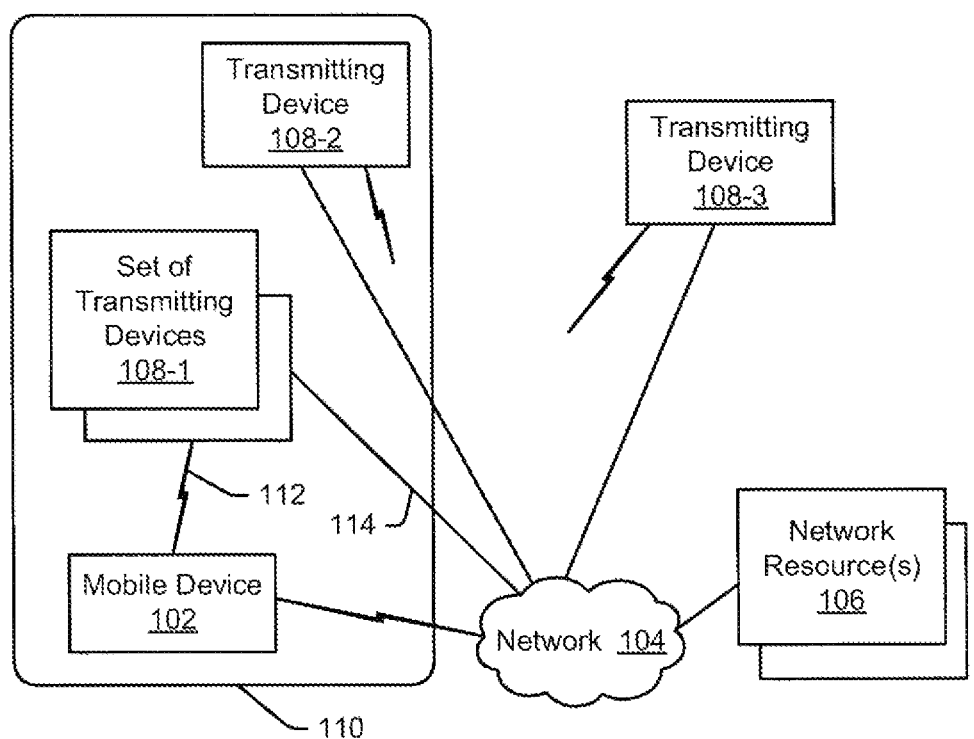
FIG. 1 is a schematic block diagram illustrating an exemplary environment that includes a mobile device to identify wireless transmitting devices for use in estimating a location of the mobile device, in accordance with an implementation.

In accordance with certain aspects, techniques for provided which may be implemented using various methods and/or apparatuses to allow a mobile device to identify and select certain wireless transmitting devices for use in estimating a location of the mobile device. A resulting selected set of wireless transmitting devices may, for example, be selected based on how reliable (e.g., accurate) their own location is to begin with. Furthermore, selected wireless transmitting devices may be selected based on an identified location context (e.g., a specific region) for which such wireless transmitting devices may prove particularly situated for use in estimating a location of the mobile device. By way of example, a specific region may comprise all or part of one or more buildings, a complex, a shopping mall, a plaza, etc.

By way of example, a mobile device may identify a plurality of wireless transmitting devices from which measurements may be obtainable to estimate a location of the mobile device. However, a mentioned previously, some of these wireless transmitting devices may provide better results due to a variety of factors, one of which may include how reliable the location information is for the wireless transmitting device. Accordingly, in this example, a mobile device may select a set of wireless transmitting devices from a plurality of wireless transmitting devices based, at least in part, on a location reliability indicator associated with each of the wireless transmitting devices.

Thus, in certain example implementations, a mobile device may obtain a location reliability indicator from a network resource (e.g., in advance, upon request, etc.). For example, a server or other like computing device may maintain a database and/or the like wherein identified wireless transmitting devices are assigned location reliability indicators which may be used to prioritize (e.g., categorize, rank, etc.) wireless transmitting devices. Thus, for example, wireless transmitting devices deemed to have reliable location information may be assigned location reliability indicators that allow or otherwise promote their selection prior to wireless transmitting devices that may have location information that is less reliable.

In certain example implementations, a wireless transmitting device may be enabled to transmit its own location reliability indicator and/or location reliability indicators from one or more other wireless transmitting devices to a mobile device. Here, for example, a wireless transmitting device may independently manage its own location reliability indicator and/or may receive its location reliability indicator from another device. Thus, such a wireless transmitting device may essentially "advertise" its level of reliability with regard to estimating a location of a mobile device.

In certain example implementations, a location reliability indicator may specify or otherwise indicate that location information corresponding to a respective wireless transmitting device has been verified in some manner. Some example location reliability indicators are presented in greater detail below, which reflect different levels of reliability based on trust and/or measurable verification techniques. Those skilled in the art will recognize, however, that other types of location reliability indicators may be implemented in accordance with the various techniques provided herein. Claimed subject matter is not therefore intended to be limited to the examples provided herein.

As mentioned, in certain example implementations, a mobile device may obtain a location context identifier and use it to identify a set of wireless transmitting devices. Here, for example, a location context identifier may be associated with a specific region and used to identify certain wireless transmitting devices from which measurements are obtainable to estimate a location of the mobile device within the specific region. Thus, in certain example implementations, a location context identifier may be associated with a particular building or floor or section thereof and a mobile device may be enabled to determine whether a particular wireless transmitting device is itself associated with the location context identifier. For example, a mobile device may compare information received from a wireless transmitting device with the location context identifier and/or a list of wireless transmitting devices associated therewith. Thus, in certain implementations a wireless transmitting device may identify itself in some manner (e.g., a unique identifier) to a mobile device which may then consult a list, for example, of wireless transmitting devices associated a location context identifier. Such list may be provided to a mobile station by a network resource, for example. In certain other example implementations, a wireless transmitting device may itself transmit one or more location context identifiers to which it may be assigned or otherwise associated with. Thus, a mobile device may compare a location context identifier received from a wireless transmitting device with a location context identifier received from a network resource. Of course, these are but a few examples and claimed subject matter is not intended to be so limited.

In accordance with certain other techniques provided herein, one or more computing devices may be enabled to associate one or more wireless transmitting devices, from which measurements are obtainable to estimate a location of a mobile device, with a location reliability indicator. The computing device may then provide the location reliability indicator to at least one other device, e.g., the wireless transmitting device, at least one other wireless transmitting device, a wireless access point, a base station, a network resource, the mobile device, etc.

As described in greater detail in the examples below, a location reliability indicator may be based, at least in part, on a level of trust for a source of location information corresponding to the wireless transmitting device. In certain example implementations a location reliability indicator may be based, at least in part, on a verification of location information corresponding to the wireless transmitting device. Thus, in certain instances, a location reliability indicator may be changed based on a change in a level of trust, a result of a verification process, and/or a passage of time.

In certain example implementations, a verification process may be implemented in which estimated location information associated with a wireless transmitting device is obtained (e.g., from one or more mobile devices, a sniffer device, etc.) such that a difference between stored location information and the estimated location information may be determined. Here, for example, a difference may comprise a linear or other like distance value, one or more comparable coordinate values, and/or other spatial information. An initial or current location reliability indicator for the wireless transmitting device may then be determined based, at least in part, on the difference. For example, a location reliability indicator for a wireless transmitting device may be identified by comparing the difference with one or more threshold values (e.g., associated with different levels of reliability). In other words, a mobile device may, for example, obtain its location (e.g., using a set of access points, etc.) and through a verification process determine if the ranging from a targeted wireless transmitting device (e.g., perhaps another access point) is within an acceptable range.

Consequently, in certain example implementations, a mobile device may identify and select a wireless transmitting device based on a location reliability identifier and possibly further on location context identifier. The location reliability identifier and/or location context identifier may, for example, be determined and/or managed in some manner by one or more computing devices. In this manner, for example, a mobile device may avoid using or attempting to use signal measurements from less reliable and/or otherwise less preferential wireless transmitting devices.

Attention is drawn now to FIG. 1, which is a schematic block diagram illustrating an example environment 100 comprising a mobile device 102, a network 104, one or more network resources 106, and a plurality of transmitting devices 108.

Mobile device 102 is representative of any electronic device that may be reasonably moved about by a user. By way of example but not limitation, mobile device 102 may comprise a computing and/or communication device such as a mobile telephone, a smart phone, a lap top computer, a tablet computer, a wearable computer, a personal digital assistant, a navigation device, etc.

Mobile device 102 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

Network 104 is representative of one or more wired and/or wireless communication networks and/or the like which enables communication between mobile device 102 and network resources 106. By way of example, network 104 may include a telecommunications and/or data network and/or services, cellular and/or other wireless networks, an intranet, the Internet, etc. Thus, network 104 may comprise an access point, a base station, one or more computing/communication resources, etc.

In certain example implementations, one or more transmitting devices 108 may comprise, in whole or part, a network resource. Thus, in certain example implementations, transmitting devices 108 may comprise wireless access points that may be coupled to one or more networks. In certain example implementations, transmitting devices 108 may comprise wireless network repeater devices (e.g., pico-cell or femto-cell devices, etc.) that may be coupled to one or more networks. In certain example implementations, transmitting devices 108 may comprise special purpose positioning signal beacon transmitting devices that may or may not be coupled to one or more networks. In certain example implementations, transmitting devices 108 may be enabled to provide a location based service (LBS), and/or other like capability. In certain example implementations, transmitting devices 108 may comprise a plurality of different types of devices.

Network resources 106 may comprise, for example, one or more computing devices, communication devices/resources, data storage devices, etc.

As illustrated in FIG. 1, environment 100 may include a specific region 110 that may be associated with a location context indicator. As illustrated in the example of FIG. 1, a set of wireless transmitting device 108-1 may be associated with a location context indicator and applicable for use in estimating a location of mobile device 102 in specific region 110. Also shown, a wireless transmitting device 108-2 may be available for use in estimating a location of mobile device 102 in specific region 110, but as described herein may not be selected to be in the set of wireless transmitting devices 108-1 based on its location reliability identifier. Further illustrated is a transmitting device 108-3 which may be located some distance from specific region 110 and also not selected to be in the set of wireless transmitting devices 108-1 based on its location context identifier.

While the set of wireless transmitting devices 108-1 and wireless transmitting device 108-2 are illustrated in FIG. 1 as being within specific region 110, it should be recognized that in an actual arrangement one or more wireless transmitting devices may be located inside or outside of specific region 110. For example, specific region 110 may comprise the fourth floor of building "A" and wireless transmitting device 108-2 may be located on the fourth floor of building "A" while one of the set of wireless transmitting devices 108-1 may be located on a different floor of building "A" and/or possibly in or on an adjacent building "B".

As illustrated in FIG. 1, mobile device 102 may transmit and/or receive wireless signals 112 from wireless transmitting devices 108 and/or network 104. Wireless transmitting devices 108 may be coupled to network 104 via wired links 114 and/or wireless links. Further, network resources 106 may be coupled to network 104 via wired links and/or wireless links.

Figure 2:
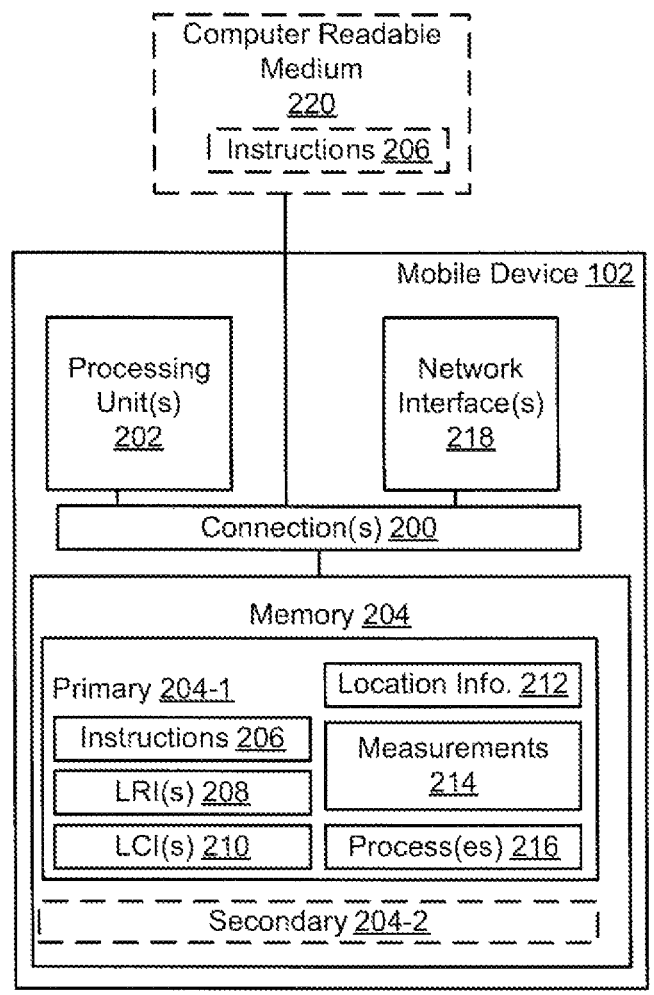
FIG. 2 is a schematic block diagram illustrating certain features of a mobile device, for example as in FIG. 1, capable of identifying wireless transmitting devices for use in estimating a location of the mobile device, in accordance with an implementation.

Reference is made next to FIG. 2, which is a schematic block diagram illustrating certain features of mobile device 102, for example as in FIG. 1, in accordance with an implementation.

As illustrated mobile device 102 may comprise one or more processing units 202 to perform data processing (e.g., in accordance with all or part of the techniques provided herein) coupled to memory 204 via one or more connections 200. Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220. As illustrated, memory 204 and/or computer readable medium 220 may comprise instructions 206 associated with data processing (e.g., in accordance with the techniques provided herein).

As further illustrated, at certain times, memory 204 may comprise data representing one or more location reliability identifiers (LRIs) 208 and/or one or more location context indicators (LCIs) 210. At times, memory 204 may comprise data representing location information 212. Location information 212 may, for example, comprise location information and/or estimated location information with respect to one or more wireless transmitting devices, location information with respect to one or more specific regions 110, estimated location information and/or other like navigation/position related information with respect to mobile device 102, and/or the like or any combination thereof.

As further illustrated, at times, memory 204 may comprise data representing measurements 214 associated with one or more signals transmitted by one or more wireless transmitting devices 108. By way of example, measurements 214 may comprise signal strength information, timing information, ranging and/or pseudoranging information, etc. In certain example implementations, at least a portion of measurements 214 may be used to estimate a location of mobile device 102. As shown here, measurements 214 may, for example, also represent information that was carried using one or more wireless signals 112. For example, with one or more processes 216 being executed in whole or part by processing unit(s) 202 and/or other like circuitry, mobile device 102 may provide and/or otherwise support position estimation. In certain example implementations, all or part of a process for estimating a location of mobile device 102 may be performed by a network resource 106 based, at least in part, on measurements 214, which mobile device may transmit using one or more network interfaces 218. Such stand-alone or distributed location estimation techniques and related processes are well known.

While process 216 is illustrated in FIG. 2 as being at least partially stored in memory 204, it should be understood that such a process(es) may be operatively provided in whole or part in one or more of processing unit(s) 202 and/or other like circuitry.

As previously mentioned, mobile device 102 may, for example, comprise one or more network interfaces 218, which may be coupled to one or more of connections 200. Network interfaces 218 may be representative of one or more wireless and/or wired network interfaces. Thus, for example, network interface 218 may comprise a wireless network interface having a radio transceiver, one or more antennas, supporting circuitry, etc.

While it is likely that a particular mobile device is capable of transmitting and/or receiving information through a wireless network, there may be times when a wired connection may be available for use by such a mobile device for transmitting and/or receiving information. Thus, in certain example implementations, network interface 218 may comprise a wired network interface (e.g., an Ethernet interface, a USB interface, etc.), which may comprise a modem or other like input/output circuit, one or more ports or cables, supporting circuitry, etc.

Figure 3:
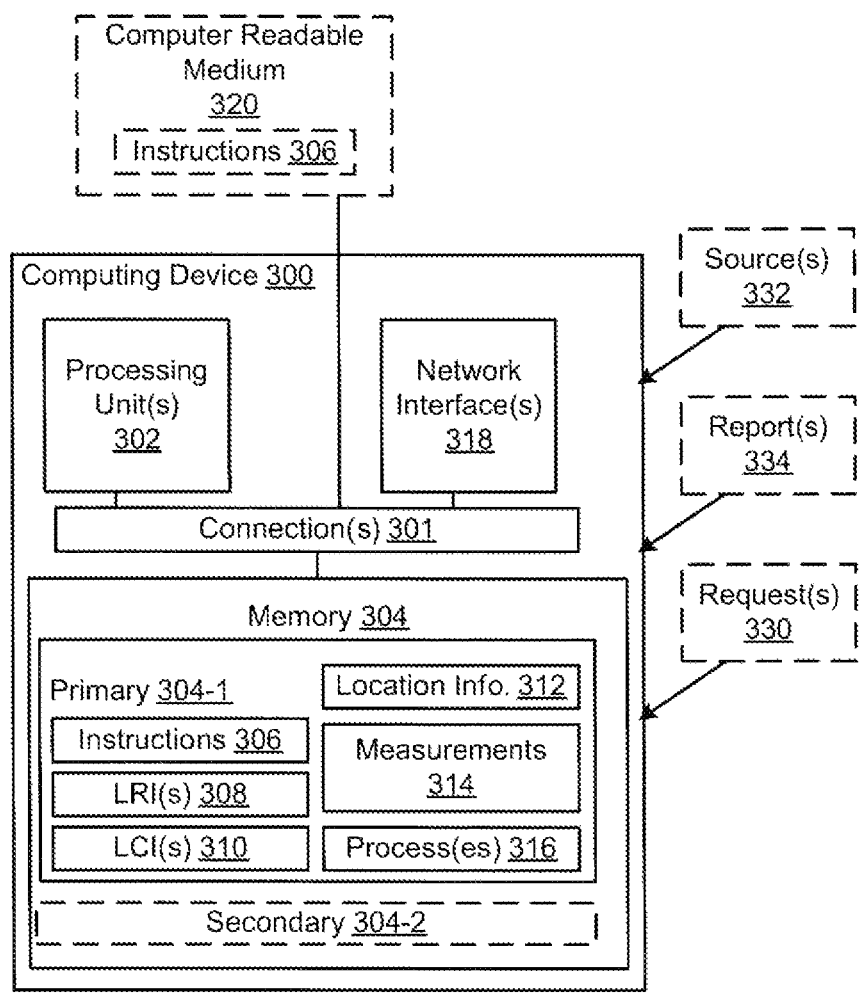
FIG. 3 is a schematic block diagram illustrating certain features of a computing device, for example as may be included in a network resource and/or transmitting device of FIG. 1, capable of supporting a mobile device in identifying wireless transmitting devices for use in estimating a location of the mobile device, in accordance with an implementation.

Reference is made next to FIG. 3, which is a schematic block diagram illustrating certain features of a computing device 300, which may be implemented in some manner in a network recourse 106 and/or a wireless transmitting device 108 for example as in FIG. 1, in accordance with an implementation.

As illustrated computing device 300 may comprise one or more processing units 302 to perform data processing (e.g., in accordance with all or part of the techniques provided herein) coupled to memory 304 via one or more connections 301. Processing unit(s) 302 may be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 34 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within computing device 300 and/or operatively coupled thereto.

Secondary memory 304-2 may comprise, for example, the same or similar type of memory as primary memory and/or one or more data storage devices or systems, such as, for example, a disk drive, an optical disc drive, a tape drive, a solid state memory drive, etc. Secondary memory 304-2 may, for example, comprise a data base and/or other like capability.

In certain implementations, secondary memory may be operatively receptive of, or otherwise configurable to couple to, computer readable medium 320. As illustrated, memory 304 and/or computer readable medium 320 may comprise instructions 306 associated with data processing (e.g., in accordance with the techniques provided herein).

As further illustrated, at certain times, memory 304 may comprise data representing one or more location reliability identifiers (LRIs) 308 associated with one or more wireless transmitting devices 108, and/or one or more location context indicators (LCIs) 310 associated with one or more specific regions 110 (see FIG. 1). In certain example implementations, an LRI 308 and/or LCI 310 may comprise separate tags or a combined tag (e.g., information in the form of data) associated with a particular wireless transmitting device 108. Such tag(s) and/or other like LRI/LCI information may be shared between the various devices in environment 100 (FIG. 1) as described herein. For example, in certain implementations, one or more requests 330 may be obtained (e.g., via network interface 318) for such tag(s) and/or other like LRI/LCI information, and/or possibly other location information 312. Requests 330 may be received over network 104 from one or more mobile devices 102, one or more network resources 106, and/or one or more wireless transmitting devices 108. Computing device 300 may, for example, respond to request 330 by providing all or part of the requested or possibly otherwise useful information.

Location information 312 may comprise, for example, location information as submitted or otherwise associated with a source 332 and/or previously stored and/or estimated location information (e.g., subsequently determined and/or reported) with respect to one or more wireless transmitting devices 108. Location information 312 may comprise, for example, location information with respect to one or more specific regions 110. Location information 312 may comprise, for example, estimated location information and/or other like navigation/position related information with respect to mobile device 102. Location information 312 may comprise, for example, additional information relating to navigation, e.g., information associated with one or more location based services and/or other like capabilities. For example, certain context or other like information associated with a specific region 110, etc., may be stored in memory 304.

As further illustrated, at times, memory 304 may comprise data representing measurements 314 associated with one or more signals received by one or more wireless transmitting devices 108. By way of example, measurements 314 may comprise signal strength information, timing information, ranging and/or pseudoranging information, etc. Measurements 314 may, for example, be obtained through one or more reports 334 received via network interface 318 from one or more mobile devices 102 and/or other computing devices.

In certain example implementations, at least a portion of measurements 214 may be used to estimate a location of mobile device 102. As shown here, measurements 214 may, for example, also represent information that was carried using one or more wireless signals 112.

For example, a position estimation capability may be provided and/or otherwise supported using one or more processes 316 which may be executed by processing unit(s) 302 and/or other like circuitry of computing device 300.

As previously mentioned, in certain example implementations, all or part of a process for estimating a location of mobile device 102 may be performed by a computing device 300 (e.g., as a network resource 106) based, at least in part, on measurements 314.

While process 316 is illustrated in FIG. 3 as being at least partially stored in memory 304, it should be understood that such a process(es) may be operatively provided in whole or part in one or more of processing unit(s) 302 and/or other like circuitry.

Computing device 300 may, for example, comprise one or more network interfaces 318 coupled to one or more of connections 301. Network interfaces 318 may be representative of one or more wireless and/or wired network interfaces.

As described in greater detail below, computing device 300 (e.g., a network resource 106) may be enabled to manage some or all of the LRIs and/or LCIs used within environment 100. For example, a wireless transmitting device 108 may be initially identified "manually" by a source 332. Thus, a source may submit a unique identifier and location information associated with the wireless transmitting device, for example. If the source is deemed trustworthy the wireless transmitting device may be associated with an LRI that indicates a high level of reliability. To the contrary, if the source is deemed less trustworthy (or maybe unknown) the wireless transmitting device may be associated with an LRI that indicates a low level of reliability. In certain instances, a source may be trusted enough to assign an LRI to the wireless transmitting device.

In other instances, an LRI may be assigned initially and/or subsequently based on an algorithm, e.g., as illustrated in the various example verification processes provided herein and/or the like. For example, one or more reports 334 may provide information gathered in environment 100 over time which may be considered in determining which LRIs and/or LCIs are associated with a particular wireless transmitting device 108.

Similarly, a source 332 may submit or suggest one or more LCIs that may be associated with the wireless transmitting device, for example. If the source is deemed trustworthy the wireless transmitting device may be associated with one or more such LCIs. If the source is deemed less trustworthy (or is perhaps unknown) the wireless transmitting device may not be initially associated with a suggested LCI until or unless a verification process supports such assignment.

A source 332 may, for example, include one or more devices and/or other resources through which an entity or person may provide input regarding a wireless transmitting device 108. For example, a system administrator and/or system administration capability may act as a source. A user (possibly unknown) may act as a source, for example, by providing information about a wireless transmitting device to a network resource (e.g., through a web page, electronic mail, etc.). A computing device (e.g., a wireless transmitting device itself) may act as a source, for example, by providing information about to a network resource (e.g., as part of a initial set-up routine or registration process, based on a timer or event occurrence, etc.). As mentioned, each source may be associated with a specific level of trust and/or reliability.

In certain example implementations, one or more reports 334 (e.g., from one or more mobile stations) may identify the presence of a wireless transmitting device 108 that may be newly installed. Location information associated with such a wireless transmitting device may be relayed by a mobile device and/or possibly discovered though other network connections/resources, and/or otherwise estimated, e.g., using location information from or associated with the reporting mobile stations. Accordingly, it may be useful for such a wireless transmitting device to be associated with a lower level LRI until more information is gathered using mobile devices and/or other network resources. Similarly, an applicable LCI may be associated with such wireless transmitting device at a subsequent time, e.g., following further verification processes.

Figure 4:
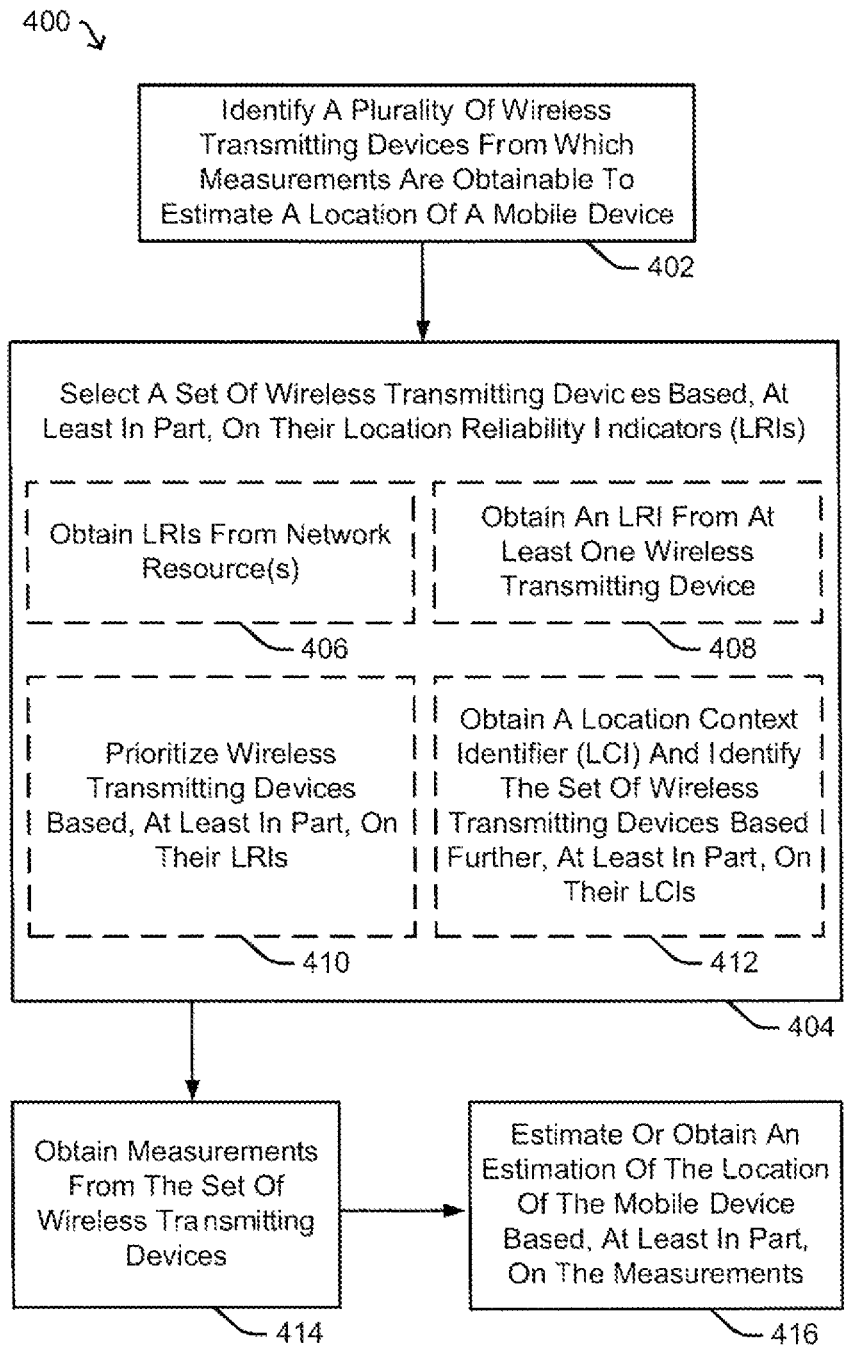
FIG. 4 is a flow diagram illustrating certain features of an exemplary process for use in a mobile device to identify wireless transmitting devices for use in estimating a location of the mobile device, in accordance with an implementation.

Attention is drawn next to FIG. 4, which is flow diagram illustrating an example process 400 for use in a mobile device to identify wireless transmitting devices for use in estimating a location of the mobile device, in accordance with an implementation.

At block 402 a plurality of wireless transmitting devices, from which measurements are obtainable to estimate a location of a mobile device, may be identified. Here, for example, a mobile device may identify one or more wireless transmitting devices based, at least in part, on one or more received wireless signals, information received from one or more network resources, and/or information stored in memory.

At block 404 a set of wireless transmitting devices may be selected. For example, a set of wireless transmitting devices may be selected from the plurality of wireless transmitting devices based, at least in part, on the location reliability indicators (LRIs) associated with each wireless transmitting device. In certain example implementations, at block 406, a location reliability indicator may be obtained from a network resource. In certain example implementations, at block 408, at least one location reliability indicator may be obtained from at least one wireless transmitting device. In certain implementations, at block 410, wireless transmitting devices may be prioritized, for example, based, at least in part, on their respective location reliability indicators. Thus, for example, wireless transmitting devices with higher priorities may be selected over wireless transmitting devices with relatively lower priorities. Indeed, in certain instances, wireless transmitting devices with relatively lower priorities (e.g., having less reliable location information) may be left out of the set of wireless transmitting devices. In certain example implementations, at block 412, a location context identifier (LCI) may be obtained and used to further identify the set of wireless transmitting devices. Thus, in certain instances, wireless transmitting devices that are not particularly situated for use in positioning within a specific region and/or possibly for use with a specific mobile device may be left out of the set of wireless transmitting devices.

In certain example implementations, each wireless transmitting device may have a LRI associated with it. In certain instances, it may be useful to associate a default LRI (e.g., with lower reliability) to wireless transmitting devices that do not appear to have an LRI. As such, in certain example implementations all of the wireless transmitting devices in a given LCI may be prioritized based on their respective LRI. In certain example implementations, an initial or further ranking of wireless transmitting devices which may be more preferred for a given LCI (e.g., as a result of their placement, etc.) may be performed or provided. For example, an LCI may also identify or otherwise provide information about or for use in ranking or otherwise prioritizing its respective wireless transmitting devices.

At block 414, measurements may be obtained from all or a portion of the set of wireless transmitting devices. It should be noted that, in certain example implementations and/or situations, a set of wireless transmitting devices may comprise a specific number of wireless transmitting devices (e.g., three, four, etc.) as may be desired for a particular location estimation technique and/or specific region. In certain other example implementations and/or situations, a set of wireless transmitting devices may comprise an excess number of wireless transmitting devices than may be needed for a particular location estimation technique and/or specific region. In still other example implementations and/or situations, a set of wireless transmitting devices may not always comprise enough wireless transmitting devices for a particular location estimation technique and/or specific region.

At block 416, a location of a mobile device may be estimated based, at least in part, on the measurements. Such estimation may be obtained locally in certain mobile devices and/or obtained from or with further assistance from a network resource.

Figure 5:
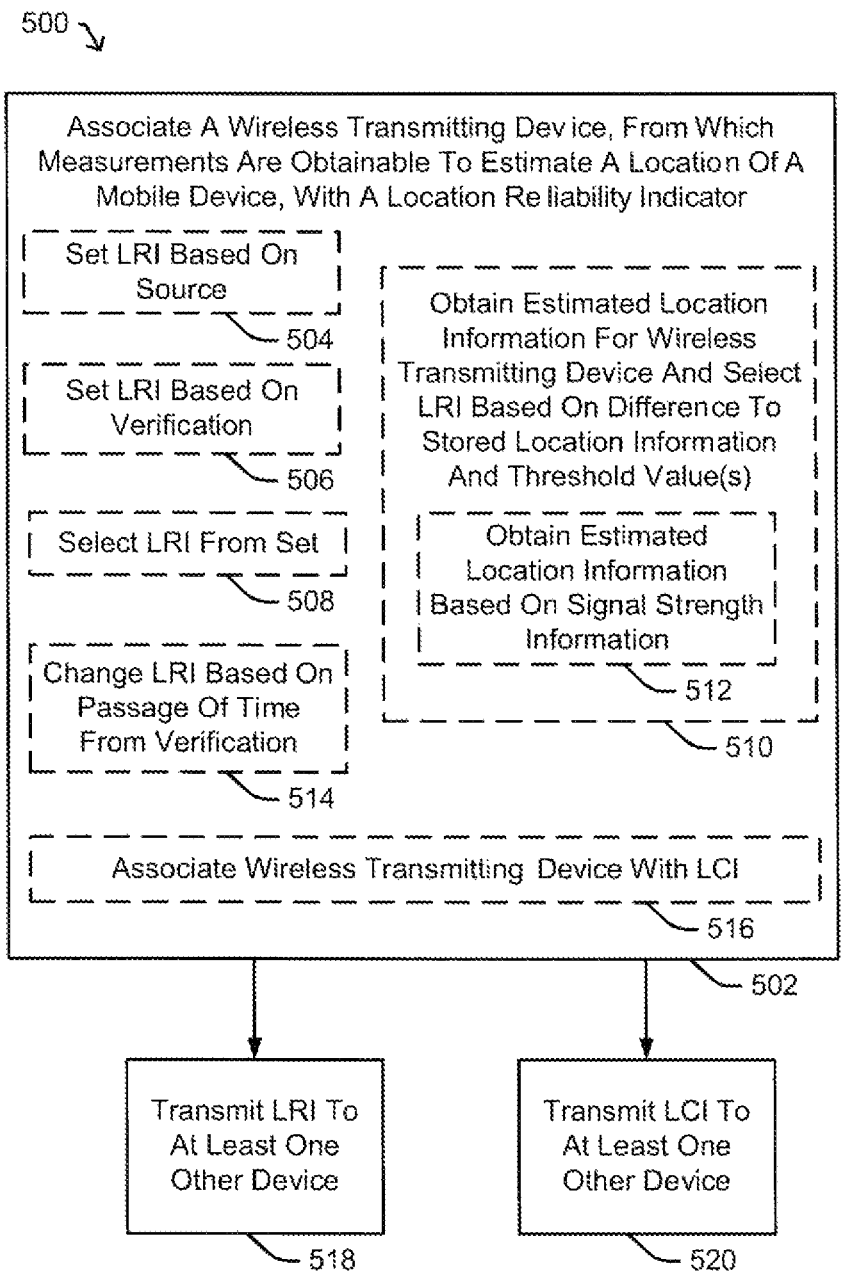
FIG. 5 is a flow diagram illustrating certain features of an exemplary process for use in a computing device to support a mobile device in identifying wireless transmitting devices for use in estimating a location of the mobile device, in accordance with an implementation.

FIG. 5 is a flow diagram illustrating certain features of an exemplary process 500 for use in a computing device to support a mobile device in identifying wireless transmitting devices for use in estimating a location of the mobile device, in accordance with an implementation. Thus, for example, all or portions of process 500 may be implemented in one or more network resources 106 and/or wireless transmitting devices 108 (FIG. 1).

At block 502 a wireless transmitting device, from which measurements are obtainable to estimate a location of a mobile device, may be associated with a location reliability indicator (LRI). In certain example implementations, at block 504 the location reliability indicator may be set based on a source of location information corresponding to the wireless transmitting device. In certain example implementations, at block 506, the location reliability indicator may be set based on a verification of location information corresponding to the wireless transmitting device. In certain example implementations, at block 508, the location reliability indicator may be selected from a set of location reliability indicators.

In certain example implementations, at block 510, estimated location information for the wireless transmitting device may be obtained and a difference between the location information and the estimated location information determined and used to select a location reliability indicator. Here, for example, a difference may be compared to one or more threshold values (e.g., corresponding to different levels of reliability and/or a set of location reliability indicators). In certain example implementations, at block 512, estimated location information may be obtained based, at least in part, on measured signal strength information.

In certain example implementations, at block 514, a location reliability indicator may be changed or otherwise affected in some manner based, at least in part, on a measurement of time following a verification of location information for wireless transmitting device.

In certain example implementations, at block 516, a wireless transmitting device may be associated with one or more location context identifiers (LCIs).

In certain example implementations, at block 518, at least the location reliability indicator may be transmitted or otherwise provided to at least one other device. In certain example implementations, at block 520 at least one location context identifier may be transmitted or otherwise provided to at least one other device.

Thus, by way of still further non-limiting examples, the techniques provided herein may be implemented as follows.

In certain example implementations, mobile device 102 may prioritize wireless access points 108 for use in obtaining measurements to estimate a location of the mobile device. Here, the mobile station may have access to tags (e.g., an LRI) associated with nearby access points which are indicative of a reliability of location information of the nearby access points. Based upon such tags, mobile device 102 may rank the access points associated with reliable location estimates for use in obtaining a position fix for the mobile device 102. In a particular implementation, a mobile device 102 may merely select the top three (or four) ranked access points for use in obtaining a position fix for the mobile station.

In certain example implementations, a location based system may establish a process for determining and verifying the accuracy and/or reliability of an estimated location of an access point for use in obtaining a position fix as discussed above. For example, an access point may be tagged as "estimated" if a location of the access point was determined based upon measurements of a beacon from the wireless transmitting device along with signal strength measurements. An access point may be tagged as "pinned" if a location for the access point was submitted by a trustworthy source (e.g., a facility owner). An access point may be tagged as "unverified" if it location was submitted by an unknown source. An access point tagged as unverified may be subsequently tagged as "unverified pinned" following a sanity check to verify the accuracy of its location by, for example, an indication from sniffer data (e.g., from one or more sniffer or other like devices within the vicinity) that the access point exists. An access point may have its tag changed from unverified pinned to pinned if a difference between a mobile device's position and a position of the access point, e.g., corrected for its current RSSI is within a threshold distance (e.g., 10 meters) of the access point. Here, for example, the position of the mobile device may be obtained without using the access point that is being verified. A mobile device could have high confidence of its estimated location from other resources, e.g., such as three or more other access points, inertial sensors, GNSS, and/or possibly via user input (e.g., manually "pinning" the mobile device location), etc.

In certain example implementations, mobile device 102 may select from available access points for obtaining a position fix in a two step process. In a first step, if three (or four) "pinned" access points are available for obtaining a range measurement, those three access points may be used for obtaining ranging measurements (to obtain a position fix) and the other access points may be ignored. In a second step, if less than three (or four) pinned access points are available, then first attempt to use unverified pinned access points until three are available. Here, for example, access points with estimated locations may be used when there is no other choice.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
    identifying, with a mobile device, a plurality of wireless transmitting devices from which measurements are obtainable to estimate a location of said mobile device; and
    selecting, with said mobile device, a set of wireless transmitting devices from said plurality of wireless transmitting devices based, at least in part, on a location reliability indicator associated, respectively, with at least each wireless transmitting device in said set of wireless transmitting devices, wherein at least one location reliability indicator for at least one wireless transmitting device in said set of wireless transmitting devices is based, at least in part, on a specific level of trust for a source involved in identifying or verifying a location of said at least one wireless transmitting device, and wherein said source is one of a plurality of sources and at least two of said plurality of sources are different types of sources, and each of said plurality of sources is assigned a corresponding specific level of trust.

2. The method as recited in claim 1, further comprising:
    with said mobile device:
        obtaining, with said mobile device, said measurements from said set of wireless transmitting devices.

3. The method as recited in claim 2, further comprising:
    estimating, with said mobile device, said location of said mobile device based, at least in part, on the obtained measurements.

4. The method as recited in claim 1, further comprising:
    obtaining, with said mobile device, at least one said location reliability indicator from a network resource.

5. The method as recited in claim 1, further comprising:
    receiving, with said mobile device, at least one said location reliability indicator from at least one of said set of wireless transmitting devices or at least one of said plurality of wireless transmitting devices.

6. The method as recited in claim 1, wherein selecting, with said mobile device, said set of wireless transmitting devices further comprises prioritizing, with said mobile device, each of at least a portion of said plurality of wireless transmitting devices based, at least in part, on said respective location reliability indicator.

7. The method as recited in claim 1, wherein at least one said location reliability indicator indicates that location information corresponding to said respective wireless transmitting device is deemed to be more reliable than location information corresponding to at least one other of said plurality of wireless transmitting devices.

8. The method as recited in claim 1, wherein at least one said location reliability indicator indicates that location information corresponding to said respective wireless transmitting device has been verified.

9. The method as recited in claim 1, further comprising:
    obtaining, with said mobile device, a location context identifier; and
    wherein identifying, with said mobile device, said plurality of wireless transmitting devices further comprises identifying, with said mobile device, at least said set of wireless transmitting devices based, at least in part, on said location context identifier.

10. The method as recited in claim 9, wherein said location context identifier is for a specific region and identifies at least said plurality of wireless transmitting devices from which measurements are obtainable to estimate said location of said mobile device within said specific region.

11. An apparatus for use in a mobile device, the apparatus comprising:
    means for identifying a plurality of wireless transmitting devices from which measurements are obtainable to estimate a location of said mobile device; and
    means for selecting a set of wireless transmitting devices from said plurality of wireless transmitting devices based, at least in part, on a location reliability indicator associated, respectively, with at least each wireless transmitting device in said set of wireless transmitting devices, wherein at least one location reliability indicator for at least one wireless transmitting device in said set of wireless transmitting devices is based, at least in part, on a specific level of trust for a source involved in identifying or verifying a location of said at least one wireless transmitting device, and wherein said source is one of a plurality of sources and at least two of said plurality of sources are different types of sources, and each of said plurality of sources is assigned a corresponding specific level of trust.

12. The apparatus as recited in claim 11, further comprising:
    means for obtaining said measurements from said set of wireless transmitting devices.

13. The apparatus as recited in claim 12, further comprising:
    means for estimating said location of said mobile device based, at least in part, on obtained measurements.

14. The apparatus as recited in claim 11, further comprising:
    means for obtaining at least one said location reliability indicator from a network resource.

15. The apparatus as recited in claim 11, further comprising:
    means for receiving at least one said location reliability indicator from at least one of said set of wireless transmitting devices or at least one of said plurality of wireless transmitting devices.

16. The apparatus as recited in claim 11, further comprising:
    means for prioritizing each of at least a portion of said plurality of wireless transmitting devices based, at least in part, on said respective location reliability indicator.

17. The apparatus as recited in claim 11, wherein at least one said location reliability indicator indicates that location information corresponding to said respective wireless transmitting device is deemed to be more reliable than location information corresponding to at least one other of said plurality of wireless transmitting devices.

18. The apparatus as recited in claim 11, wherein at least one said location reliability indicator indicates that location information corresponding to said respective wireless transmitting device has been verified.

19. The apparatus as recited in claim 11, further comprising:
means for obtaining a location context identifier; and
means for identifying at least said set of wireless transmitting devices based, at least in part, on said location context identifier.

20. The apparatus as recited in claim 19, wherein said location context identifier is for a specific region and identifies at least said plurality of wireless transmitting devices from which measurements are obtainable to estimate said location of said mobile device within said specific region.

21. An apparatus for use in a mobile device, the apparatus comprising:
a wireless network interface; and
at least one processing unit configured to identify a plurality of wireless transmitting devices from which measurements are obtainable via said wireless network interface to estimate a location of said mobile device, and select a set of wireless transmitting devices from said plurality of wireless transmitting devices based, at least in part, on a location reliability indicator associated, respectively, with at least each wireless transmitting device in said set of wireless transmitting devices, wherein at least one location reliability indicator for at least one wireless transmitting device in said set of wireless transmitting devices is based, at least in part, on a specific level of trust for a source involved in identifying or verifying a location of said at least one wireless transmitting device, and wherein said source is one of a plurality of sources and at least two of said plurality of sources are different types of sources, and each of said plurality of sources is assigned a corresponding specific level of trust.

22. The apparatus as recited in claim 21, wherein said at least one processing unit is further configured to obtain said measurements from said set of wireless transmitting devices using said wireless network interface.

23. The apparatus as recited in claim 22, wherein said at least one processing unit is further configured to estimate said location of said mobile device based, at least in part, on the obtained measurements.

24. The apparatus as recited in claim 21, wherein said at least one processing unit is further configured to obtain at least one said location reliability indicator from a network resource using said wireless network interface.

25. The apparatus as recited in claim 21, wherein said at least one processing unit is further configured to obtain at least one said location reliability indicator from at least one of said set of wireless transmitting devices or at least one of said plurality of wireless transmitting devices using said wireless network interface.

26. The apparatus as recited in claim 21, wherein said at least one processing unit is further configured to prioritize each of at least a portion of said plurality of wireless transmitting devices based, at least in part, on said respective location reliability indicator.

27. The apparatus as recited in claim 21, wherein at least one said location reliability indicator indicates that location information corresponding to said respective wireless transmitting device is deemed to be more reliable than location information corresponding to at least one other of said plurality of wireless transmitting devices.

28. The apparatus as recited in claim 21, wherein at least one said location reliability indicator indicates that location information corresponding to said respective wireless transmitting device has been verified.

29. The apparatus as recited in claim 21, wherein said at least one processing unit is further configured to obtain a location context identifier using said wireless network interface, and to further identify at least said set of wireless transmitting devices based, at least in part, on said location context identifier.

30. The apparatus as recited in claim 29, wherein said location context identifier is for a specific region and identifies at least said plurality of wireless transmitting devices from which measurements are obtainable to estimate said location of said mobile device within said specific region.

31. An article comprising:
a non-transitory computer readable medium having computer implementable instructions stored therein that are executable by one or more processing units of a mobile device to:
identify a plurality of wireless transmitting devices from which measurements are obtainable to estimate a location of said mobile device; and
select a set of wireless transmitting devices from said plurality of wireless transmitting devices based, at least in part, on a location reliability indicator associated, respectively, with at least each wireless transmitting device in said set of wireless transmitting devices, wherein at least one location reliability indicator for at least one wireless transmitting device in said set of wireless transmitting devices is based, at least in part, on a specific level of trust for a source involved in identifying or verifying a location of said at least one wireless transmitting device, and wherein said source is one of a plurality of sources and at least two of said plurality of sources are different types of sources, and each of said plurality of sources is assigned a corresponding specific level of trust.

32. The article as recited in claim 31, wherein said computer implementable instructions are further executable by said one or more processing units to:
initiate obtaining said measurements from said set of wireless transmitting devices.

33. The article as recited in claim 32, wherein said computer implementable instructions are further executable by said one or more processing units to:
initiate estimating said location of said mobile device based, at least in part, on the obtained measurements.

34. The article as recited in claim 31, wherein said computer implementable instructions are further executable by said one or more processing units to:
initiate obtaining at least one said location reliability indicator from a network resource.

35. The article as recited in claim 31, wherein said computer implementable instructions are further executable by said one or more processing units to:
initiate obtaining at least one said location reliability indicator from at least one of said set of wireless transmitting devices or at least one of said plurality of wireless transmitting devices.

36. The article as recited in claim 31, wherein said computer implementable instructions are further executable by said one or more processing units to:
prioritize each of at least a portion of said plurality of wireless transmitting devices based, at least in part, on said respective location reliability indicator.

37. The article as recited in claim 31, wherein at least one said location reliability indicator indicates that location information corresponding to said respective wireless transmitting device is deemed to be more reliable than location information corresponding to at least one other of said plurality of wireless transmitting devices.

38. The article as recited in claim 31, wherein at least one said location reliability indicator indicates that location information corresponding to said respective wireless transmitting device has been verified.

39. The article as recited in claim 31, wherein said computer implementable instructions are further executable by said one or more processing units to:
   initiate obtaining a location context identifier; and
   identify at least said set of wireless transmitting devices based, at least in part, on said location context identifier.

40. The article as recited in claim 39, wherein said location context identifier is for a specific region and identifies at least said plurality of wireless transmitting devices from which measurements are obtainable to estimate said location of said mobile device within said specific region.

41. A method comprising:
   with a processing unit, associating at least one wireless transmitting device, from which measurements are obtainable to estimate a location of a mobile device, with a location reliability indicator, said location reliability indicator being based, at least in part, on a specific level of trust for a source involved in identifying or verifying a location of said at least one wireless transmitting device, and wherein said source is one of a plurality of sources and at least two of said plurality of sources are different types of sources, and each of said plurality of sources is assigned a corresponding specific level of trust; and
   transmitting, with said mobile device, at least said location reliability indicator.

42. The method as recited in claim 41, wherein transmitting, with said processing unit, at least location reliability indicator comprises transmitting at least said location reliability indicator to at least one other mobile device.

43. The method as recited in claim 41, wherein said location reliability indicator is based, at least in part, on a verification of location information corresponding to said wireless transmitting device.

44. The method as recited in claim 41, wherein said location reliability indicator is selected, with said processing unit, from a set of location reliability indicators comprising at least a first location reliability indicator and a second location reliability indicator, and wherein said first location reliability indicator indicates a higher level of reliability than said second location reliability indicator with regard to location information corresponding to said wireless transmitting device.

45. The method as recited in claim 44, further comprising:
   obtaining, with said processing unit, estimated location information for said wireless transmitting device;
   determining, with said processing unit, a difference between said location information and said estimated location information; and
   selecting, with said processing unit, said location reliability indicator for said wireless transmitting device as either said first location reliability indicator or said second location reliability indicator based, at least in part, on said difference and one or more threshold values.

46. The method as recited in claim 45, wherein said estimated location information is obtained, with said processing unit, based, at least in part, on signal strength information measured from one or more wireless signals transmitted by said wireless transmitting device and received by one or more mobile devices.

47. The method as recited in claim 44, further comprising:
   changing, with said processing unit, said location reliability indicator for said wireless transmitting device from said first location reliability indicator to said second location reliability indicator based, at least in part, on a measurement of time following a verification of location information corresponding to said wireless transmitting device.

48. The method as recited in claim 41, further comprising:
   associating, with said processing unit, at least said wireless transmitting device with a location context identifier; and
   transmitting, with said processing unit, at least said location context identifier.

49. The method as recited in claim 48, wherein said location context identifier is for a specific region and identifies that at least said wireless transmitting device is acceptable for use in estimating said location of said mobile device within said specific region.

50. The method as recited in claim 41, wherein transmitting, with said processing unit, said at least said location reliability indicator further comprises:
   transmitting, with said processing unit, said at least said location reliability indicator to at least one of: said wireless transmitting device, at least one other wireless transmitting device, a wireless access point, a base station, a network resource, and/or said mobile device.

51. An apparatus for use in at least one computing device, the apparatus comprising:
   means for associating at least one wireless transmitting device, from which measurements are obtainable to estimate a location of a mobile device, with a location reliability indicator, said location reliability indicator being based, at least in part, on a specific level of trust for a source involved in identifying or verifying a location of said at least one wireless transmitting device, and wherein said source is one of a plurality of sources and at least two of said plurality of sources are different types of sources, and each of said plurality of sources is assigned a corresponding specific level of trust; and
   means for transmitting at least said location reliability indicator to at least one other device.

52. The apparatus as recited in claim 51, wherein said at least one other device comprises at least one other mobile device.

53. The apparatus as recited in claim 51, wherein said location reliability indicator is based, at least in part, on a verification of location information corresponding to said wireless transmitting device.

54. The apparatus as recited in claim 51, wherein said location reliability indicator is selected from a set of location reliability indicators comprising at least a first location reliability indicator and a second location reliability indicator, and wherein said first location reliability indicator indicates a higher level of reliability than said second location reliability indicator with regard to location information corresponding to said wireless transmitting device.

55. The apparatus as recited in claim 54, further comprising:
   means for obtaining estimated location information for said wireless transmitting device;
   means for determining a difference between said location information and said estimated location information; and means for selecting said location reliability indicator for said wireless transmitting device as either said first location reliability indicator or said second location reliability indicator based, at least in part, on said difference and one or more threshold values.

56. The apparatus as recited in claim 55, wherein said estimated location information is obtained based, at least in part, on signal strength information measured from one or more wireless signals transmitted by said wireless transmitting device and received by one or more mobile devices.

57. The apparatus as recited in claim 54, further comprising:
means for changing said location reliability indicator for said wireless transmitting device from said first location reliability indicator to said second location reliability indicator based, at least in part, on a measurement of time following a verification of location information corresponding to said wireless transmitting device.

58. The apparatus as recited in claim 51, further comprising:
means for associating at least said wireless transmitting device with a location context identifier; and
means for transmitting at least said location context identifier to said at least one other device.

59. The apparatus as recited in claim 58, wherein said location context identifier is for a specific region and identifies that at least said wireless transmitting device is acceptable for use in estimating said location of said mobile device within said specific region.

60. The apparatus as recited in claim 51, wherein said at least one other device comprises at least one of: said wireless transmitting device, at least one other wireless transmitting device, a wireless access point, a base station, a network resource, and/or said mobile device.

61. An apparatus for use in at least one computing device, the apparatus comprising:
a network interface; and
one or more processing units configured to associate at least one wireless transmitting device, from which measurements are obtainable to estimate a location of a mobile device, with a location reliability indicator, said location reliability indicator being based, at least in part, on a specific level of trust for a source involved in identifying or verifying a location of said at least one wireless transmitting device, and wherein said source is one of a plurality of sources and at least two of said plurality of sources are different types of sources, and each of said plurality of sources is assigned a corresponding specific level of trust; and initiate transmission of said at least said location reliability indicator to at least one other device via said network interface.

62. The apparatus as recited in claim 61, wherein said at least one other device comprises at least one other mobile device.

63. The apparatus as recited in claim 61, wherein said location reliability indicator is based, at least in part, on a verification of location information corresponding to said wireless transmitting device.

64. The apparatus as recited in claim 61, wherein said one or more processing units is further configured to select said location reliability indicator from a set of location reliability indicators comprising at least a first location reliability indicator and a second location reliability indicator, and wherein said first location reliability indicator indicates a higher level of reliability than said second location reliability indicator with regard to location information corresponding to said wireless transmitting device.

65. The apparatus as recited in claim 64, wherein said one or more processing units is further configured to:
obtain estimated location information for said wireless transmitting device;
determine a difference between said location information and said estimated location information; and
select said location reliability indicator for said wireless transmitting device as either said first location reliability indicator or said second location reliability indicator based, at least in part, on said difference and one or more threshold values.

66. The apparatus as recited in claim 65, wherein said estimated location information is obtained based, at least in part, on signal strength information measured from one or more wireless signals transmitted by said wireless transmitting device and received by one or more mobile devices.

67. The apparatus as recited in claim 64, wherein said one or more processing units is further configured to change said location reliability indicator for said wireless transmitting device from said first location reliability indicator to said second location reliability indicator based, at least in part, on a measurement of time following a verification of location information corresponding to said wireless transmitting device.

68. The apparatus as recited in claim 61, wherein said one or more processing units is further configured to:
associate at least said wireless transmitting device with a location context identifier; and
initiate transmission of at least said location context identifier to said at least one other device via said network interface.

69. The apparatus as recited in claim 68, wherein said location context identifier is for a specific region and identifies that at least said wireless transmitting device is acceptable for use in estimating said location of said mobile device within said specific region.

70. The apparatus as recited in claim 61, wherein said at least one other device comprises at least one of: said wireless transmitting device, at least one other wireless transmitting device, a wireless access point, a base station, a network resource, and/or said mobile device.

71. An article comprising:
a non-transitory computer readable medium having computer implementable instructions stored therein that are executable by one or more processing units of a computing device to:
associate at least one wireless transmitting device, from which measurements are obtainable to estimate a location of a mobile device, with a location reliability indicator, said location reliability indicator being based, at least in part, on a specific level of trust for a source involved in identifying or verifying a location of said at least one wireless transmitting device, and wherein said source is one of a plurality of sources and at least two of said plurality of sources are different types of sources, and each of said plurality of sources is assigned a corresponding specific level of trust; and
initiate transmission of at least said location reliability indicator to at least one other device.

72. The article as recited in claim 71, wherein said at least one other device comprises at least one other mobile device.

73. The article as recited in claim 71, wherein said location reliability indicator is based, at least in part, on a verification of location information corresponding to said wireless transmitting device.

74. The article as recited in claim 71, wherein said location reliability indicator is selected from a set of location reliability indicators comprising at least a first location reliability indicator and a second location reliability indicator, and wherein said first location reliability indicator indicates a higher level of reliability than said second location reliability indicator with regard to location information corresponding to said wireless transmitting device.

75. The article as recited in claim 74, wherein said computer implementable instructions are further executable by said one or more processing units to:

obtain estimated location information for said wireless transmitting device;

determine a difference between said location information and said estimated location information; and select said location reliability indicator for said wireless transmitting device as either said first location reliability indicator or said second location reliability indicator based, at least in part, on said difference and one or more threshold values.

76. The article as recited in claim 75, wherein said estimated location information is obtained based, at least in part, on signal strength information measured from one or more wireless signals transmitted by said wireless transmitting device and received by one or more mobile devices.

77. The article as recited in claim 74, wherein said computer implementable instructions are further executable by said one or more processing units to:

change said location reliability indicator for said wireless transmitting device from said first location reliability indicator to said second location reliability indicator based, at least in part, on a measurement of time following a verification of location information corresponding to said wireless transmitting device.

78. The article as recited in claim 71, wherein said computer implementable instructions are further executable by said one or more processing units to:

associate at least said wireless transmitting device with a location context identifier; and initiate transmission of at least said location context identifier to said at least one other device.

79. The article as recited in claim 78, wherein said location context identifier is for a specific region and identifies that at least said wireless transmitting device is acceptable for use in estimating said location of said mobile device within said specific region.

80. The article as recited in claim 71, wherein said at least one other device comprises at least one of: said wireless transmitting device, at least one other wireless transmitting device, a wireless access point, a base station, a network resource, and/or said mobile device.

81. The method as recited in claim 1, wherein at least one of said plurality of sources comprises a computing device, and said corresponding specific level of trust for said computing device is for said computing device.

82. The method as recited in claim 1, wherein at least one of said plurality of sources comprises a computing device, and said corresponding specific level of trust for said computing device is assigned to an entity and/or a person for said computing device.

83. The apparatus as recited in claim 11, wherein at least one of said plurality of sources comprises a computing device, and said corresponding specific level of trust for said computing device is:

(i) for said computing device; or (ii) assigned to an entity and/or a person for said computing device.

84. The apparatus as recited in claim 21, wherein at least one of said plurality of sources comprises a computing device, and said corresponding specific level of trust for said computing device is:

(i) for said computing device; or (ii) assigned to an entity and/or a person for said computing device.

85. The article as recited in claim 31, wherein at least one of said plurality of sources comprises a computing device, and said corresponding specific level of trust for said computing device is:

(i) for said computing device; or (ii) assigned to an entity and/or a person for said computing device.

86. The method as recited in claim 41, wherein at least one of said plurality of sources comprises a computing device, and said corresponding specific level of trust for said computing device is:

(i) for said computing device; or (ii) assigned to an entity and/or a person for said computing device.

87. The apparatus as recited in claim 51, wherein at least one of said plurality of sources comprises a computing device, and said corresponding specific level of trust for said computing device is:

(i) for said computing device; or (ii) assigned to an entity and/or a person for said computing device.

88. The apparatus as recited in claim 61, wherein at least one of said plurality of sources comprises a computing device, and said corresponding specific level of trust for said computing device is:

(i) for said computing device; or (ii) assigned to an entity and/or a person for said computing device.

89. The article as recited in claim 71, wherein at least one of said plurality of sources comprises a computing device, and said corresponding specific level of trust for said computing device is:

(i) for said computing device; or (ii) assigned to an entity and/or a person for said computing device.

* * * * *